Figure 1:
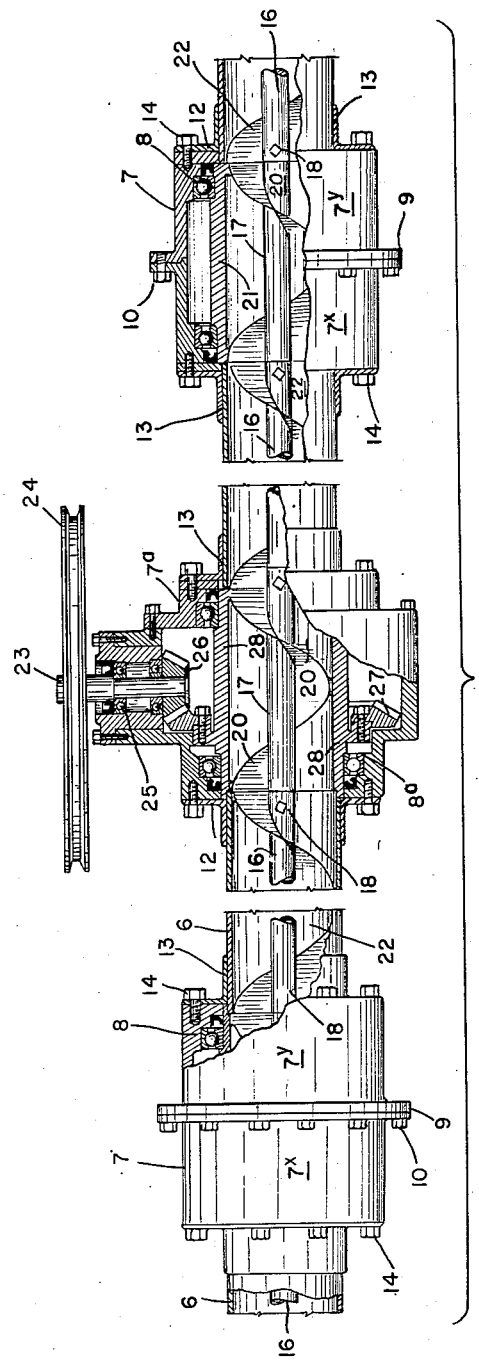

March 4, 1958 J. R. HOWE 2,825,443
TUBULAR CONVEYOR

Filed May 10, 1952 3 Sheets-Sheet 1

INVENTOR.
John R. Howe
BY
ATTORNEY

March 4, 1958  J. R. HOWE  2,825,443
TUBULAR CONVEYOR

Filed May 10, 1952  3 Sheets-Sheet 2

INVENTOR.
John R. Howe
BY
ATTORNEY

March 4, 1958   J. R. HOWE   2,825,443
TUBULAR CONVEYOR

Filed May 10, 1952   3 Sheets-Sheet 3

INVENTOR.
John R. Howe
BY
ATTORNEY

United States Patent Office 2,825,443
Patented Mar. 4, 1958

2,825,443

TUBULAR CONVEYOR

John R. Howe, Denver, Colo.

Application May 10, 1952, Serial No. 287,092

4 Claims. (Cl. 198—213)

This invention relates to tubular conveyors and more particularly relates to tubular conveyors having a rotary screw member as the material moving component of the assembly.

Tubular conveyors of this type are used for many purposes. For example, in grain handling operations, it is frequently necessary to move grain from truck bodies or other transport vehicles into storage bins or sheds and to move grain into different locations within such sheds. The increasing demands for storage on farms and the increase in size of storage facilities for grain and other granular materials has created a demand for tubular conveyors in greater lengths and of greater material handling capacity. In shorter lengths, it is possible to mount a single, continuous spiral flight section on a single shaft and to drive such assembly in the tube through a single transmission system in association with a motor or other exterior power source. However, when lengths of fifty feet or more are needed, the weight of the material required in the spiral assembly in order to satisfy the durability and functional requirements of the moving parts greatly reduces the mobility of such units and creates excessive power requirements.

It is an object of the present invention to provide a simple, durable and efficient tubular conveyor which is adapted to be produced as relatively a long unit without impairment of mobility or operating efficiency of the unit.

Another object of the invention is to provide a simple, durable and efficient tubular conveyor comprising a plurality of independent functional sections assembled as a unitary structure with separate drives for each of the sections of the assembly.

A further object of the invention is to provide a simple, durable and efficient tubular conveyor unit having a novel suspension for the spiral conveyor member of the unit.

Other objects reside in novel details of construction and novel combinations and arrangements of parts, all of which will be fully described in the course of the following description.

The present invention is based on the discovery that a tubular conveyor can be formed of alternate stationary and rotary tube sections with a spiral conveyor member formed of joined central shaft and spiral flight sections extending throughout the length of the tubular conveyor and the rotary tube sections being formed integrally with the associated shaft and spiral section to provide a highly efficient bearing support for the rotary members, thus reducing the power requirements for a unit of given length and capacity.

Figure 3:
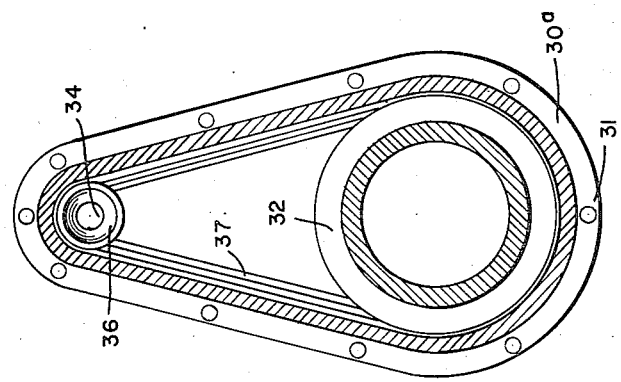
Figure 5:
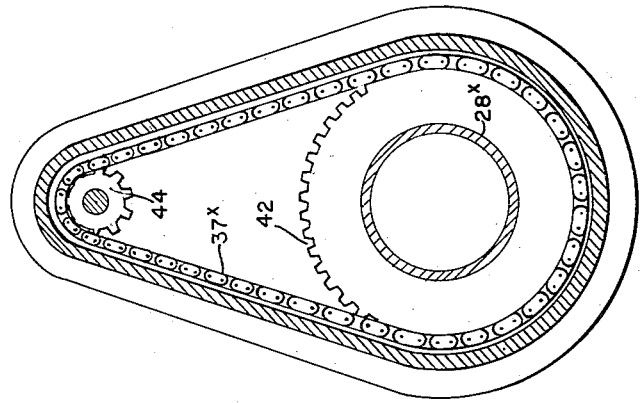
Figure 4:
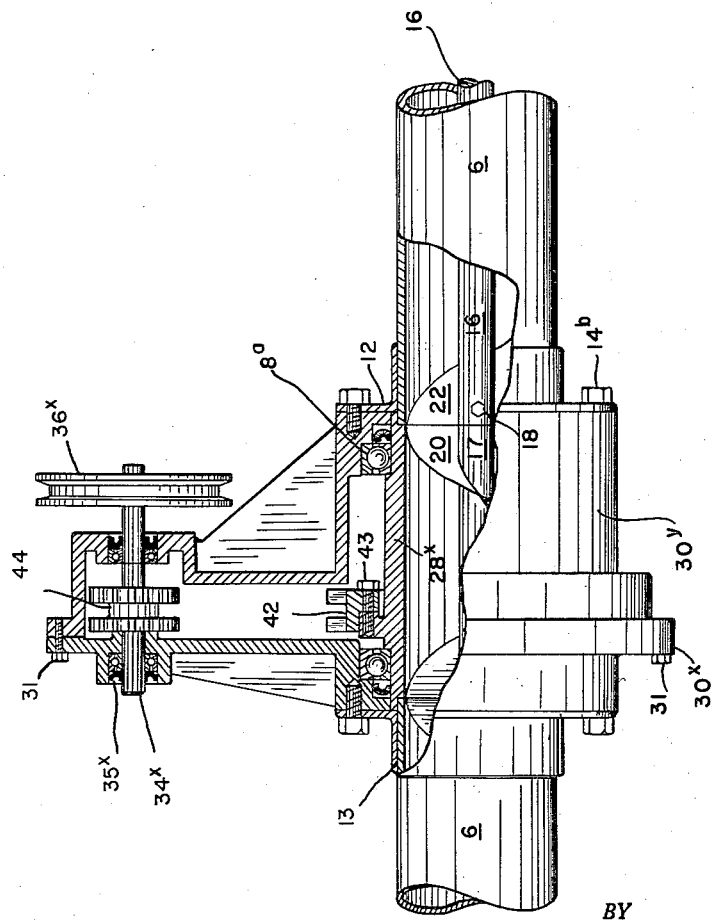

The practice of the present invention will be best understood by reference to the accompanying drawings. In the drawings, in the several views of which like parts are designated similarly, Fig. 1 is a side elevation, partially broken away to show the arrangement of interior parts, of one form of conveyor unit embodying features of this invention, Fig. 2 is a fragmentary, side elevation partially broken to show interior arrangement of a modified form of driving assembly for a tubular conveyor embodying features of the present invention, Fig. 3 is a section taken along the line 3—3, Fig. 2, Fig. 4 is a fragmentary, side elevation, partially broken to show interior arrangement, of another modified form of driving assembly for a tubular conveyor embodying features of the present invention, and Fig. 5 is a section taken along the line 5—5, Fig. 4.

Figure 2:
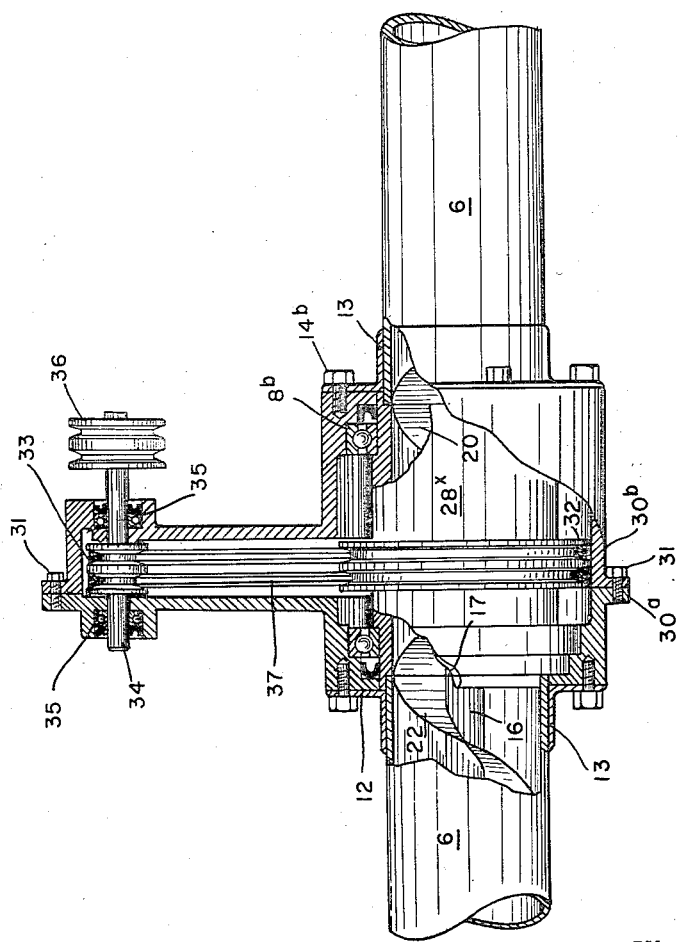

The structure shown in Fig. 1 represents a typical embodiment utilizing features of the present invention. The conveyor unit shown in Fig. 1 comprises a tubular portion 6, inclusive of a plurality of enlarged housing portions 7 and 7a providing cylindrical enclosures for bearing assemblies 8 and 8a respectively, in which portions of the conveyor mechanism of the unit are journalled for rotation. The housings 7 comprise two identical sections 7x and 7y having abutting flanges 9 joined by bolts 10 or the like.

Flanged angle members 12 are welded or otherwise held against movement on the tubular portion 6, as shown at 13, and are held in bolted connection with the enlarged housing portion 7 as indicated at 14.

A shaft comprising alternate driving and driven sections 16 and 17 extends throughout the length of the tubular conveyor with the respective sections joined as shown at 18. The section 17 is formed integrally with a spiral flight section 20 and a tubular extension portion 21, the latter being journalled for rotation in bearings 8 and forming an extension of the tubular portion 6 of the conveyor.

At intervals along tube 6, a transmission system connects the shaft 16 and its associated flight sections 22 with a suitable prime mover (not shown). The transmission system comprises a sheave 24 having a shaft 23 journalled in bearings 25 interiorly of housing 7a and carrying a bevel gear 26 meshing with a second bevel gear 27 in bolted connection with the extension portion 28 of tubular member 6.

The structural arrangement just described makes it possible to have a conveyor unit of any desired length, such as 75 feet for example, with a single driving section and with any plurality of driven units such as the assembly enclosed within the housing units 7. By providing driving and driven sections 17 and 16 of the shaft unit carrying the spiral flight sections 20 and 22, the spiral conveyor may be easily rotated under full load conditions without requiring undue weight in the conveyor assembly or a large capacity power unit to provide the necessary motive capacity.

The conveyor unit shown in Figs. 2 and 3 employs a structural arrangement similar to the one just described, except for differences in the driving assembly. It has a tubular portion 6 as previously described, idler units within housing enlargements 7 (not shown), a shaft comprising shaft sections 16 and 17 and spiral flight sections 20 and 22. The housing enlargement of the driving assembly of this conveyor unit comprises two sections 30a and 30b held together by bolts 31 and containing a bearing assembly 8b in which the tubular extension 28x is journalled for rotation and a sheave 32 is fixed on extension 28x for rotating said extension within the bearing assembly 8b.

A second sheave 33 mounted on a stub shaft 34 journalled in bearings 35 carries a second sheave 36 which is adapted to be connected with a prime mover (not shown) and rotates the extension 28x through the intermediary of V-belts 37.

The arrangement shown in Figs. 4 and 5 are similar to those previously described except for differences in the driving features. Between section of tube portions 6, an enlarged housing member is mounted comprising cooperative sections 30x and 30y which are joined by bolts 31 and enclose a roller bearing assembly 8a in which the tubular extension 28x, shaft section 17 and spiral flights 20 rotate.

A sprocket member 42 is held on the exterior of extension 28x by bolts 43 and is driven by a drive sprocket 44 which is mounted on a shaft 34x journalled in bearings 35x and carrying at its opposite end a drive sheave 36x connected with a prime mover (not shown). A chain 37x interconnects sprockets 42 and 44 to provide the power transmission.

In all the described arrangements, the functioning of the unit will be essentially the same. The tubular conveyor is made to any desired length and will comprise one or more idler bearing assemblies and at least one driving assembly. Preferably the unit will be in several sections when long units are required and each section will be a convenient shipping length. At the site of installation, the several sections will be joined by connecting the shaft sections 16 and 17 and associated structure. Any of the sheaves 24, 36 or 36x can be connected with the prime mover such as an electric motor or gasoline engine by V-belt.

Any desired feed inlet (not shown) which is usually an end opening in the tubular conveyor 6, or may be a separate feeding device is connected to said tube and the opposite end of the conveyor will be open to effect the discharge, to which a discharge spout may be connected if desired.

Grain or other free flowing or granular material is fed into the conveyor at the feed inlet, and thereafter is advanced through the length of the unit by the rotation of the spiral flight, inclusive of the flights 20 within the rotary tube portions 28 or 28x. The bearing supports for the spiral provided at intervals throughout the length of the units permits the tube and the conveyor mechanism to be made from light weight parts without sacrificing size, durability or functional efficiency of the unit.

On very long lengths, a plurality of driving assemblies will be incorporated in a simple conveyor unit, while in medium or shorter lengths a simple driving unit will be ample. Preferably, a plurality of idler bearing units will be provided in most installations, although for minimum lengths one such assembly at one end of the tube and one driving assembly at the opposite end will provide adequate support for the rotary members.

From the foregoing, it will be apparent that the practice of the present invention permits considerable choice and individual selection in the lengths of units to be operated and in the arrangement of driving and driven bearing assemblies within the unit, in addition to the size and composition of material comprising the unit.

While the different forms of driving arrangement shown in the drawings have been separately described, it will be understood that although they are intended as alternate arrangements, all of such forms might be included in a simple conveyor unit such as that shown in Fig. 1, with the form of Fig. 1 driving one conveyor section, the form of Fig. 2 driving a second section, and the form of Fig. 4 a third section. Usually only one form of drive will be provided even in multiple drive units because of the operator's preference for such form.

In addition, when the conveyor length is not too great it is possible to drive directly onto the shaft of the spiral conveyor. In such event, the shaft would extend beyond the end of the tube and carry a sheave, sprocket or gear as required. Suitable support would be provided by rotary tube sections and associated bearing structure in the foregoing arrangement.

In all such arrangements, the tube comprises alternate stationary and rotary sections in coaxial arrangement with the bearings for the rotary section supported from adjoining stationary sections. As assembled, the shaft and associated spiral ribbon is a functional unit and may be driven at any selected point along its length, but preferably at a central point in the shorter lengths, and at uniform intervals in the multiple driving arrangements.

By having the bearings for the rotary members positioned outside the path of material travel it is possible to utilize the entire interior space of the tube as a conveyor and no difficulty arises from jamming or binding at the bearings as would occur if internal bearings were provided. Also, the bearings provide ample support for whatever weight of rotary structure is required in a given unit and hence the conveyor structure needs only sufficient metal to resist wear and prevent distortion.

What I claim is:

1. A tubular conveyor comprising an elongated tube of substantially constant diameter, said tube having alternate rotary and stationary portions detachably interconnected lengthwise of said conveyor and provided with a feed inlet at one end and a discharge outlet at the opposite end, a sectionalized rotary spiral member extending through said tube and rotatable as a unit, said member having a continuous shaft and a continuous spiral ribbon attached thereto, each section of the spiral member enclosed by a rotary tube portion being interconnected with said tube for conjoint rotation therewith, a rotary seal at each junction of a rotary portion and a stationary portion, a bearing housing supported from two stationary tube portions and enclosing an intermediate rotary portion, said rotary portion being journalled for rotation in said housing and drive means mounted on said bearing housing exteriorly of said tube and being interconnected with at least one of said rotary tube portions for driving said spiral member.

2. Structure as defined in claim 1 in which the driving means is a train of gears.

3. Structure as defined in claim 1 in which the driving means is V-belt transmission.

4. Structure as defined in claim 1 in which the driving means is a chain and sprocket assembly.

References Cited in the file of this patent

UNITED STATES PATENTS

| | | |
|---|---|---|
| 1,032,850 | Mount | July 16, 1912 |
| 1,099,956 | Williams | June 16, 1914 |
| 2,103,145 | Carter | Dec. 21, 1937 |
| 2,224,991 | Schweickart et al. | Dec. 17, 1940 |
| 2,425,423 | Donaldson | Aug. 12, 1947 |
| 2,446,492 | Scott | Aug. 3, 1948 |
| 2,545,140 | Escher | Mar. 13, 1951 |
| 2,610,727 | Beldin | Sept. 16, 1952 |

FOREIGN PATENTS

| | | |
|---|---|---|
| 506,881 | France | Aug. 31, 1920 |
| 569,632 | Great Britain | June 1, 1945 |